US009280657B2

(12) United States Patent
Eluard et al.

(10) Patent No.: US 9,280,657 B2
(45) Date of Patent: Mar. 8, 2016

(54) APPARATUS AND METHOD FOR MANAGING PASSWORDS

(71) Applicant: THOMSON LICENSING, Issy de Moulineaux (FR)

(72) Inventors: Marc Eluard, Saint-Malo (FR); Yves Maetz, Melesse (FR)

(73) Assignee: THOMSON LICENSING, Issy les Moulineaux (FR)

( * ) Notice: Subject to any disclaimer, the term of this patent is extended or adjusted under 35 U.S.C. 154(b) by 116 days.

(21) Appl. No.: 14/248,435

(22) Filed: Apr. 9, 2014

(65) Prior Publication Data

US 2014/0317705 A1    Oct. 23, 2014

(30) Foreign Application Priority Data

Apr. 19, 2013    (EP) .................................... 13305520

(51) Int. Cl.
| G06F 15/16 | (2006.01) |
| H04L 29/06 | (2006.01) |
| G06F 21/46 | (2013.01) |
| G06F 21/31 | (2013.01) |
| H04L 9/32 | (2006.01) |
| H04N 7/167 | (2011.01) |

(52) U.S. Cl.
CPC .............. *G06F 21/46* (2013.01); *G06F 21/31* (2013.01)

(58) Field of Classification Search
CPC ....... G06F 21/31; H04L 63/083; H04L 63/08; H04L 63/102; H04L 63/085
USPC .......... 713/168–174, 182–186, 202; 709/206, 709/225, 229, 249, 389; 726/2–8
See application file for complete search history.

(56) References Cited

U.S. PATENT DOCUMENTS

| 7,373,516 B2 * | 5/2008 | Ashok ..................... G06F 21/31 713/183 |
| 2005/0015614 A1 * | 1/2005 | Gilfix ...................... G06F 21/31 726/7 |

FOREIGN PATENT DOCUMENTS

| EP | 1993059 | 11/2008 |
| JP | 2005208763 | 8/2005 |
| JP | 2007114976 | 5/2007 |
| WO | WO0051244 | 8/2000 |
| WO | WO0195545 | 12/2001 |
| WO | WO2006048043 | 5/2006 |

OTHER PUBLICATIONS

Search Report Dated Aug. 28, 2013.
Mehler et al., "Improving Usability Through Password-Corrective Hashing", SPIRE 2006, LNCS 4209, Springer Verlag, Berlin, 2006, pp. 193-204.

* cited by examiner

*Primary Examiner* — Evans Desrosiers
(74) *Attorney, Agent, or Firm* — Tutunjian & Bitetto, P.C.

(57) ABSTRACT

A method for managing passwords for a user. A processor of an apparatus storing at least one received, incorrect password proposal receives via a user interface a further password proposal from a user; generates a hash value for the further password proposal; sends the hash value to the authentication server; receives from the authentication server a message indicative of whether the hash value corresponds to a correct password or to an incorrect password. In case the message indicates that the hash value corresponds to a correct password, the processor uses a distance function on each incorrect password proposal to obtain a distance value representative of a distance between the incorrect password proposal and the correct password; and sending to the authentication server hash values for password proposals for which the distance value is lower than or equal to a threshold value. Also provided are the apparatus and a computer program support. The disclosure can provide resistance to typing errors in the password proposals.

13 Claims, 3 Drawing Sheets

US 9,280,657 B2

APPARATUS AND METHOD FOR MANAGING PASSWORDS

This application claims the benefit, under 35 U.S.C. §119 of European Patent Application No. 13305520.2, filed Apr. 19, 2013.

TECHNICAL FIELD

The present disclosure relates generally to computer systems and in particular to the treatment of passwords in such systems.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Passwords are ubiquitous in today's computer systems, for example to authenticate a user for log-on. In its generic definition, a password is constituted of a succession of symbols taken within a predefined alphabet (for example: 4 numerical values for PIN code). A password is generally stronger the longer it is, in particular if the password is a mixture of uppercase and lowercase letters, numbers, and characters such as &, " and #. However, a more complicated password is generally more complicated to type properly, especially since the typed characters do not appear on the screen. In addition, since users may be obliged to input the passwords many times a day, the passwords are often typed very quickly. It is thus not surprising that an input password can contain typing errors. Moreover touchscreen-based devices like smartphones and tablets use virtual keyboards to enter some text, including passwords. With this type of input, typing errors can be quite frequent.

The prior art comprises a number of solutions that provide passwords that are resistant to typing errors.

The tool Password Variator builds a file with all possible variations on the password, emulating up to three typos such as missed characters, duplicated characters, extra characters, wrong order and wrong case. Andrew Mehler and Steven Skiena provide a different solution in Improving Usability Through Password-Corrective Hashing. Their solution processes the password before hashing—for example by sorting the input password alphabetically to correct transpositions—so that it is likely that a slightly misspelt password hashes to the same hash value as the correct password. It is evident that such multiplication of "acceptable" passwords drastically reduces the strength of the password.

The solutions in U.S. Pat. No. 7,373,516 and JP 2005/208763 compares an input password with a stored password in the "password space," i.e. in the clear, to determine if the former is "similar" to the latter. However, since these solutions require a comparison of the plaintext version of the password, they cannot be used in real systems where storing the password in clear is generally unacceptable for obvious security reasons. Generally, authentication is handled by a server that stores a hashed version of the password, to be compared by a hashed version of the password proposal typed by the user. This is due to the fact that if two inputs to the hash function are different, then the output is generally completely different, even if the inputs differ by just one letter.

JP 2007-114976 teaches a device, such as a PC, that among other things provides the function of keeping a count of the number of times a mistyped password is input and storing a mistyped password as an acceptable password when the number of times is sufficiently large, e.g. ten times. The skilled person will appreciate that the solution is insecure since there does not appear to be any control of the addition of the mistyped passwords; when a wrong password has been input ten times, it is stored as an acceptable password, which means that a hacker only needs to input a password ten times to have it accepted.

It can therefore be appreciated that there is a need for a solution that can allow an authentication system to allow mistyped passwords without having the drawbacks of the prior art solutions. The present disclosure provides such a solution.

SUMMARY

In a first aspect, the disclosure is directed to an apparatus for managing passwords comprising: a user interface configured to receive a password proposal from a user and a processor configured to: generate a hash value for the password proposal; send the hash value to an authentication server; receive from the authentication server a message indicative of whether the hash value corresponds to a correct password or to an incorrect password. The processor is further configured to: store password proposals corresponding to incorrect passwords and, in case the message indicates that the hash value corresponds to a correct password: use a distance function on each password proposal corresponding to incorrect passwords to obtain a distance value representative of a distance between the password proposal and the correct password; and send to the authentication server hash values only for password proposals for which the distance value satisfy a distance criterion.

In a first embodiment, the processor is further configured to delete at least one stored password proposal in response to an event other than reception of the message indicative of a correct password.

In a second embodiment, the user has a group of at least one password that is accepted as correct passwords by the authentication server, the group comprising one primary password and zero or more secondary passwords; and wherein the message is further indicative of whether the hash value corresponds to the primary password or one of the secondary passwords and wherein the processor is further configure to use the distance function and send hash values for password proposals for which the distance value is lower than or equal to a threshold value only in case the message indicates that the hash value corresponds to the primary password.

In a third embodiment, the processor is further configured to delete stored password proposals in case the message indicates that the hash value corresponds to a correct password.

In a fourth embodiment, the processor is configured to store the password proposal upon reception of a message indicating that the hash value for the password proposal does not correspond to a correct password.

In a fifth embodiment, the processor is configured to store the password proposal upon reception of the password proposal. It is advantageous that the processor is configured to store also the hash value for the password proposal.

In a sixth embodiment, the processor is further configured to implement the authentication server.

In a second aspect, the disclosure is directed to a method for managing passwords for a user. A processor of an apparatus storing at least one received, incorrect password proposal receives via a user interface a further password proposal from a user; generates a hash value for the further password proposal; sends the hash value to an authentication server; receives from the authentication server a message indicative of whether the hash value corresponds to a correct password or to an incorrect password. In case the message indicates that the hash value corresponds to a correct password, the processor uses a distance function on each incorrect password proposal to obtain a distance value representative of a distance between the incorrect password proposal and the correct password; and sends to the authentication server hash values only for password proposals for which the distance value satisfy a distance criterion.

In a first embodiment, the processor deletes at least one received, incorrect password proposal in response to an event other than reception of the message indicative of a correct password.

In a second embodiment, the user has a group of at least one password that is accepted as correct passwords by an authentication server, the group comprising one primary password and zero or more secondary passwords; the message is further indicative of whether the hash value corresponds to the primary password or one of the secondary passwords; and the processor uses the distance function and sends hash values for password proposals for which the distance value is lower than or equal to a threshold value only in case the message indicates that the hash value corresponds to the primary password.

In a third embodiment, the processor deletes the at least one received, incorrect password proposal in case the message indicates that the hash value corresponds to a correct password.

In a fourth embodiment, the processor stores the password proposal upon reception of a message indicating that the hash value for the password proposal does not correspond to a correct password.

In a fifth embodiment, the processor stores the password proposal upon reception of the password proposal.

In a third aspect, the disclosure is directed to a non-transitory computer program support that stores instructions that, when executed by a processor performs the method of the first aspect.

BRIEF DESCRIPTION OF DRAWINGS

Preferred features of the present disclosure will now be described, by way of non-limiting example, with reference to the accompanying drawings, in which.

DESCRIPTION OF EMBODIMENTS

Figure 1:
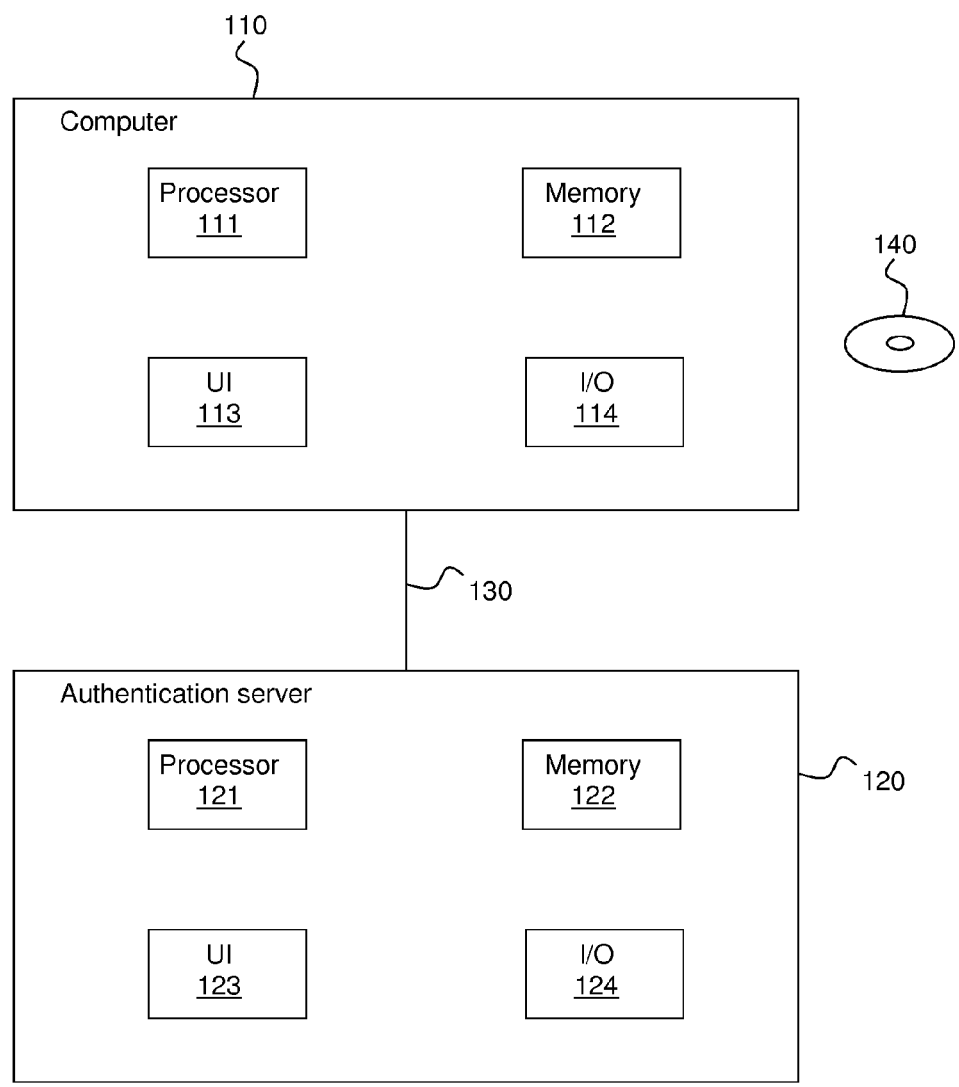
FIG. 1 illustrates an exemplary system in which the disclosure may be implemented.

FIG. 1 illustrates an exemplary system in which the disclosure may be implemented. The system comprises a computing device ("computer") 110 and an authentication server 120. The computer 110 and the authentication server (hereinafter "server") 120 can be any kind of suitable computer or device capable of performing calculations, such as a standard Personal Computer (PC) or workstation. The computer 110 and the server 120 each preferably comprise at least one processor 111, 121, RAM memory 112, 122, a user interface 113, 123 for interacting with a user, and a second interface 114, 124 for interaction with other devices over connection 130. The computer 110 and the server 120 each also preferably comprise an interface for reading a software program from a digital data support 140 that stores instructions that, when executed by a processor, performs any of the password methods described hereinafter. The skilled person will appreciate that the illustrated devices are very simplified for reasons of clarity and that real devices in addition would comprise features such as persistent storage. The skilled person will appreciate that the present disclosure may also be implemented on just the computer 110 if the password just provides access to the computer itself; in this case, the server 120 is implemented in the computer.

Figure 2:
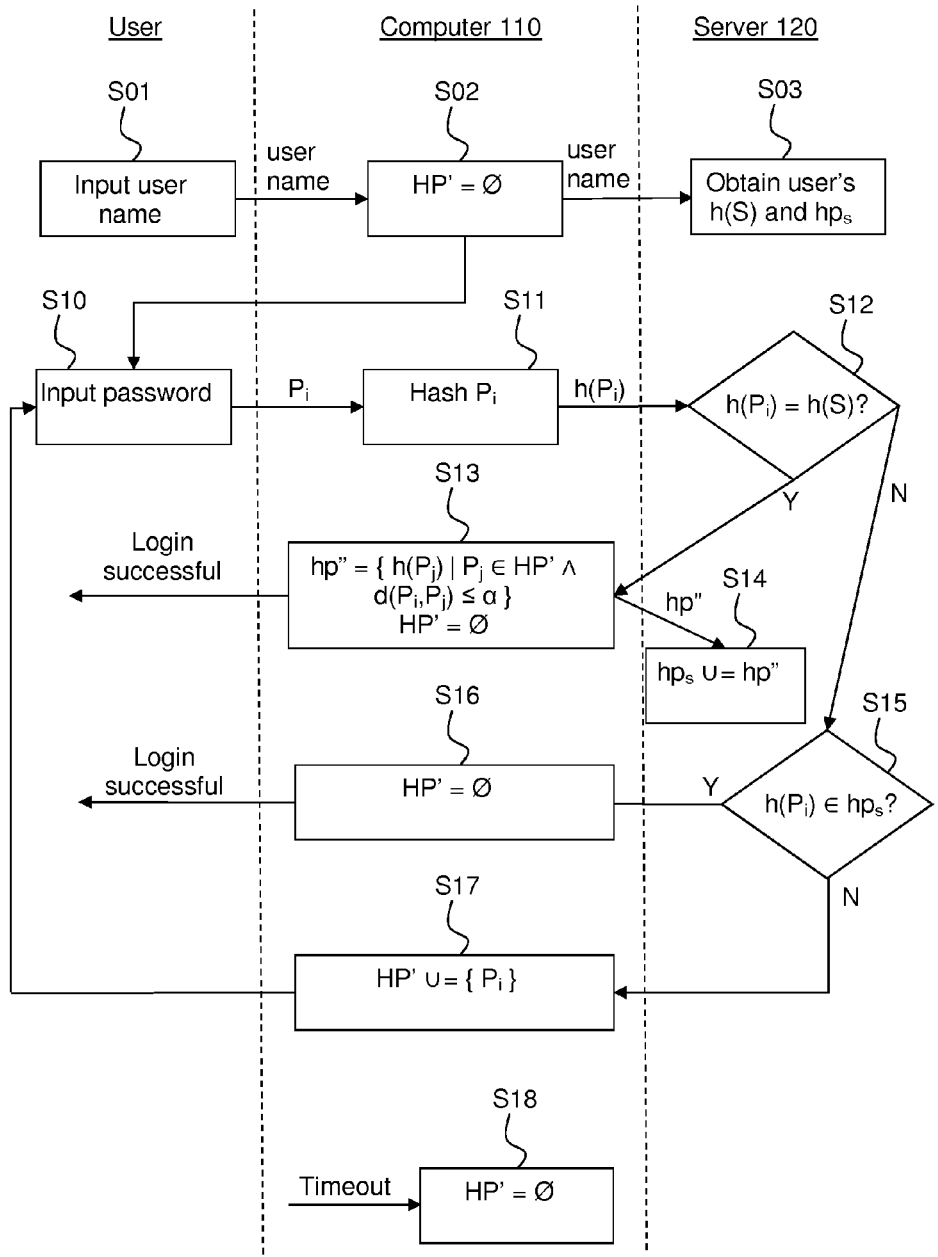
FIG. 2 illustrates a first exemplary method of password authentication of the present disclosure.

FIG. 2 illustrates a first exemplary method of password authentication of the present disclosure. In a first step, the user inputs S01 its identity, i.e. the user name, through the user interface 113 of the computer 110. The computer 110 sets S02 a group of input password proposals (to be explained hereinafter) to an empty group and forwards the user name to the server 120. The user name permits the server 120 to retrieve S03 hashes of one or more stored acceptable passwords for the user (a primary password and, if such exist, at least one secondary password, as will be seen hereinafter). It will be appreciated that in case the disclosure is implemented just on the computer 110, then it is possible to have a single user, in which case there is no need to provide the user name; in other words, steps S01-S03 are automatic.

The user enters S10 a password proposal $P_i$ (hereafter named proposal) using the user interface 113 of the computer 110, which then hashes S11 the proposal $P_i$ to obtain a hashed proposal $h(P_i)$ that is sent to the server 120. The computer also temporarily stores the proposal $P_i$. The server compares S12 the hashed proposal $h(P_i)$ with a stored hashed primary password $h(S)$. In case of a match, a message is sent to the computer 110 that preferably informs the user that the login is successful. The computer also performs S13 a function that will be described hereinafter.

In case the hashed proposal $h(P_i)$ does not match the stored, hashed primary password $h(S)$, the server 120 verifies S15 if the hashed proposal $h(P_i)$ matches any of the hashes of secondary passwords contained in $hp_s$ (further described hereinafter). If this is the case, then the login is successful and a message is preferably sent to the computer 110 so that the user may be informed. The computer 110 deletes S16 all the proposals in a group HP' of entered, incorrect proposals from the group, which will be further explained hereinafter.

However, in case the hashed proposal $h(P_i)$ does not match any of the hashes of secondary passwords contained in $hp_s$, then server 120 sends a message to inform the computer of this. The computer adds S17 the proposal $P_i$ to a group HP' of entered, incorrect proposal and informs the user that the entered proposal is incorrect and invites the user to enter a new proposal. Naturally, the disclosure may be combined with various prior art solutions to increase the security of the system, for example by blocking further login attempts after, say, three unsuccessful attempts.

The method can then iterate through the password input step S10, the proposal hashing step S11, the proposal comparison step S12 and, depending on the correctness of the input proposal, other steps already described. Since the group HP' of entered, incorrect proposals during the second and following iterations comprises at least one entered proposal, the explanation of the function performed by the computer in step S13 may now be explained in an illustrative manner.

In step S13, the user has, after one or more attempts, input the correct primary password, i.e. a password for which the hash $h(P_i)$ matches the hash $h(S)$ of the primary password.

The computer 110 then checks if any proposal $P_j$ in the group HP' of entered, incorrect proposal is "close" to the correct primary password and generates a group hp" of hash values of "close" passwords; hp"=$\{h(P_j)|P_j \in HP' \land d(P_i,P_j) \leq \alpha\}$, where d denotes a distance function and $\alpha$ denotes a threshold for a corresponding distance value, i.e. what is deemed as "close". Put another way, an incorrect proposal is considered "close" if it satisfies a distance criterion. There are many suitable prior art distance functions, such as the functions that calculate the Levenshtein distance, the Damerau-Levenshtein or the Hamming distance; the skilled person will appreciate that the choice of distance depends on the "errors"—e.g. character substitution, transposition, addition and deletion—that are judged as acceptable. In addition, the threshold $\alpha$ is chosen depending on how "close" a mistyped password should be to be accepted in the future; for example a threshold of 1 or possibly 2 are preferred values. In addition, the computer 110 deletes the proposals in HP', i.e. it sets the group to an empty group.

The computer 110 then sends the group of hash values hp" to the server 120. It is advantageous that the computer 110 provides some proof of the authenticity of the hash values, for example by appending the hash value of the primary password to the beginning of the message. The server 120 adds S14 the hash values in the group hp" to the group $hp_s$ of secondary passwords. Naturally, the server 120 can also check if any of the hash values in the group hp" already exist in the group $hp_s$ and then only add the new ones.

To increase the security of the solution, it is preferred that the server 120, when the hashed proposal corresponds to the stored hash (i.e. Y in step S12), goes to a state where it waits for new secondary passwords for the user. This way, the server will store secondary passwords for the user only when the correct password has been input. It is advantageous to associate this memory with a timer.

It will thus be appreciated that a mistyped password can, provided that it is followed by the correct primary password, be added to the group of secondary passwords, which means that it then can be used for login.

In an alternative embodiment, the group HP' comprises entered proposals (not necessarily incorrect ones) and the proposal is added to this group already in step S11 instead of in step S17. In this case, the correct proposal can be removed from the group HP' before the group hp" of hash values of close passwords is generated in step S13.

It will be appreciated that it in either embodiment is possible for the computer 110 to store the proposals $P_i$ in a group HP' as described and to store the hash value $h(P_i)$ of the proposal $P_i$ in a group hp' of hash values for proposals in step S11 and then, in step S13, add the hash values of close passwords to the group hp" of hash values of close passwords, while the hash values corresponding to "far" passwords are not. Put another way, only hash values for close passwords are transferred from group hp' to group hp".

In a further variant, the server 120 stores the received hash values of proposals $h(P_i)$ in a group $hp_s$" for the user and verifies that the hash values in hp" is at least a subset of the group $hp_s$". This is to ensure that the hash values in hp" really correspond to input proposals and that they, for example, have not been added by a hacker using a man-in-the-middle attack.

In a variant embodiment, the computer 110 also performs the function in case the hash of an input proposal matches the hash of a secondary password; i.e. step S13 can also follow step S15.

In a preferred embodiment, the computer associates a timer with each input, incorrect proposal in HP' and deletes the proposal whose timer expires. Alternatively, the computer may use a timer and delete all the input proposals in HP' when the timer expires, which is illustrated by S18 in FIG. 2. This increases the security of the system, since it makes it impossible for a hacker to input a number of proposal before the user arrives and inputs the correct password that would validate the proposals. In a variant, that may be combined with other embodiments, the group HP' is limited to n proposals and acts in a FIFO manner so that the oldest proposal is dropped when there is a need to make room for a new proposal.

Figure 3:
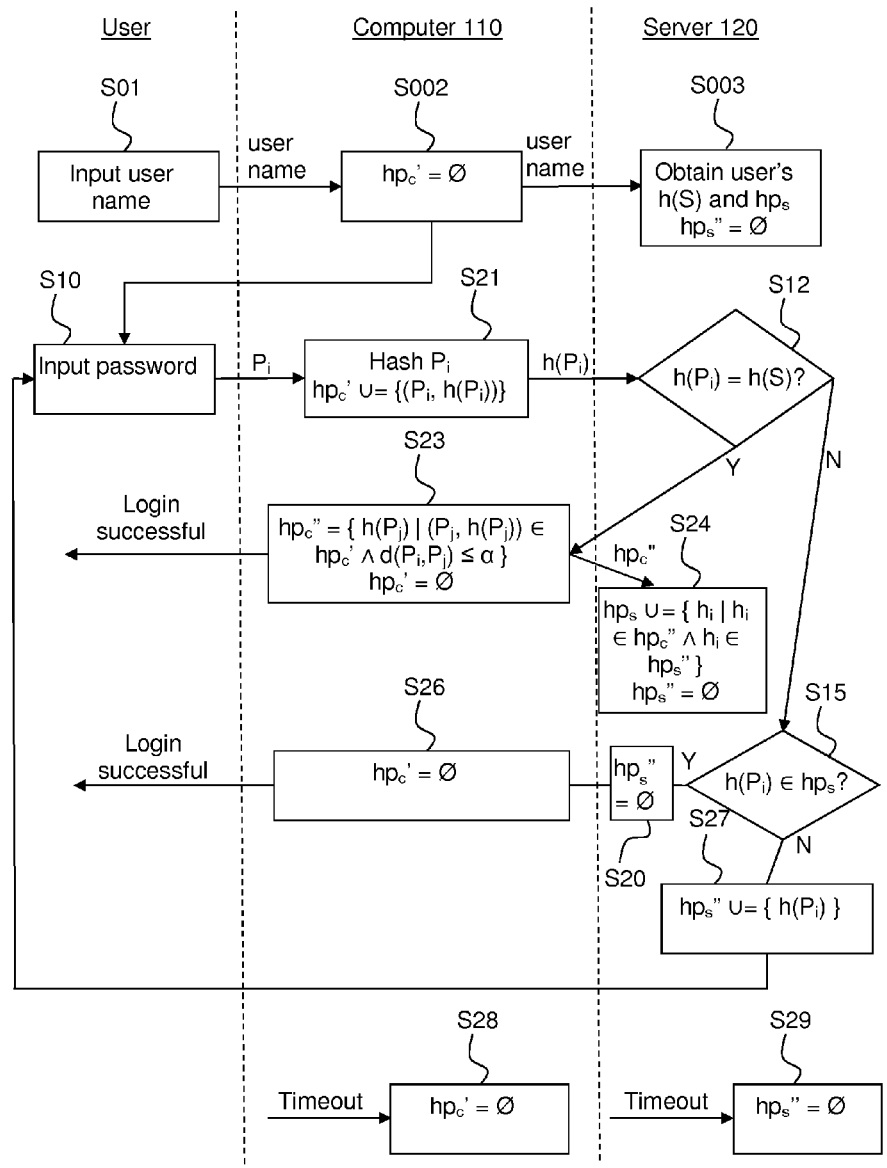
FIG. 3 illustrates a second exemplary method of password authentication of the present disclosure.

FIG. 3 illustrates a second exemplary method of password authentication of the present disclosure in which a number of variants and embodiments are incorporated. The user inputs S01 its identity, as previously described. The computer 110 then sets S002 the $hp_c$' of hash values $(P_i)$ of password proposals to an empty group, and forwards the user name to the server 120. The server 120 retrieves S03 hashes of one or more stored acceptable passwords for the user (a primary password and, if such exist, at least one secondary password), and sets a group $hp_s$" of received hash values for the user to an empty group.

The user enters S10 a proposal $P_i$. The computer 110 hashes S21 the proposal $P_i$ to obtain a hashed proposal $h(P_i)$ that is sent to the server 120. The computer 110 also stores the proposal tuple $(P_i, h(P_i))$ in the group $hp_c$'.

The server compares S12 the hashed proposal $h(P_i)$ with a stored hashed primary password h(S). In case of a match, a message is sent to the computer 110 that preferably informs the user that the login is successful. The computer also determines S23 the distance d between the correct proposal and the other proposals in the group $hp_c$', and puts the hash values corresponding to "close" proposals in a group $hp_c$". The computer 110 also sets the group $hp_c$' to an empty group and sends the group $hp_c$" to the server. The server 120 adds S24 to the list $hp_s$ of secondary passwords the common elements between $hp_c$" and $hp_s$" (described hereinafter) and clears $hp_s$".

In case the hashed proposal $h(P_i)$ does not match the stored, hashed primary password h(S), the server 120 verifies S15 if the hashed proposal $h(P_i)$ matches any of the hashes of secondary passwords contained in $hp_s$. If this is the case, then the login is successful and a message is preferably sent to the computer 110 so that the user may be informed. The server 120 deletes S20 all values in $hp_s$" of hash values for proposals. The computer 110 deletes S26 all values in $hp_c$' of hash values for proposals.

However, in case the hashed proposal $h(P_i)$ does not match any of the hashes of secondary passwords contained in $hp_s$, then server 120 sends a message to inform the computer of this and adds S27 the hash value $h(P_i)$ to the group $hp_s$" of received, incorrect hash values.

The method can then iterate through the steps, as described for the preferred embodiment illustrated in FIG. 2.

It is preferred to use a timer to empty S28 the group $hp_c$' when the timer expires. It is preferred to use a timer to empty S29 the group $hp_s$" when the timer expires.

The skilled person will appreciate that it is preferred to protect the messages, in particular the hash values, between the computer 110 and the server 120, for example by encryption using a salt. A preferred way to protect the messages is through the use of the Secure Authenticated Channel described in WO 2006/048043.

It will be appreciated that the present disclosure can provide password system that is resistant to typing errors and that:

protects the passwords by hashing during transfer and during storage, does not unnecessarily weaken the system by accepting many variants of the password, but only accepts incorrect passwords that are close and actually entered by the user.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. An apparatus for managing passwords comprising:
a user interface configured to receive a password proposal from a user; and
a processor configured to:
generate a hash value for the password proposal;
send the hash value to an authentication server;
receive from the authentication server a message indicative of whether the hash value corresponds to a correct password or to an incorrect password;
store password proposals corresponding to incorrect passwords; and in case the message indicates that the hash value corresponds to a correct password:
use a distance function on each password proposal corresponding to incorrect passwords to obtain a distance value representative of a distance between the password proposal and the correct password; and
send to the authentication server hash values only for password proposals for which the distance value satisfies a distance criterion;
wherein the user has a group of at least one password that is accepted as correct passwords by the authentication server, the group comprising one primary password and zero or more secondary passwords; and
wherein the message is further indicative of whether the hash value corresponds to the primary password or one of the secondary passwords and wherein the processor is further configured to use the distance function and send hash values for password proposals for which the distance value is lower than or equal to a threshold value only in case the message indicates that the hash value corresponds to the primary password.

2. The apparatus of claim 1, wherein the processor is further configured to delete at least one stored password proposal in response to an event other than reception of the message indicative of a correct password.

3. The apparatus of claim 1, wherein the processor is further configured to delete stored password proposals in case the message indicates that the hash value corresponds to a correct password.

4. The apparatus of claim 1, wherein the processor is configured to store the password proposal upon reception of a message indicating that the hash value for the password proposal does not correspond to a correct password.

5. The apparatus of claim 1, wherein the processor is configured to store the password proposal upon reception of the password proposal.

6. The apparatus of claim 5, wherein the processor is further configured to store also the hash value for the password proposal.

7. The apparatus of claim 1, wherein the processor is further configured to implement the authentication server.

8. A method for managing passwords for a user, performed by a processor of an apparatus storing at least one received, incorrect password proposal, the method comprising:
receiving via a user interface a further password proposal from a user;
generating a hash value for the further password proposal;
sending the hash value to an authentication server;
receiving from the authentication server a message indicative of whether the hash value corresponds to a correct password or to an incorrect password; and
in case the message indicates that the hash value corresponds to a correct password:
using a distance function on each incorrect password proposal to obtain a distance value representative of a distance between the incorrect password proposal and the correct password; and
sending to the authentication server hash values only for password proposals for which the distance value satisfies a distance criterions
wherein the user has a group of at least one password that is accepted as correct passwords by an authentication server, the group comprising one primary password and zero or more secondary passwords; and wherein the message is further indicative of whether the hash value corresponds to the primary password or one of the secondary passwords and wherein the using the distance function and sending hash values for password proposals for which the distance value is lower than or equal to a threshold value are performed only in case the message indicates that the hash value corresponds to the primary password.

9. The method of claim 8, further comprising deleting at least one received, incorrect password proposal in response to an event other than reception of the message indicative of a correct password.

10. The method of claim 8, further comprising deleting the at least one received, incorrect password proposal in case the message indicates that the hash value corresponds to a correct password.

11. The method of claim 8, further comprising storing the password proposal upon reception of a message indicating that the hash value for the password proposal does not correspond to a correct password.

12. The method of claim 8, further comprising storing the password proposal upon reception of the password proposal.

13. A non-transitory computer program support storing instructions that, when executed by a processor performs the method of claim 8.

* * * * *